United States Patent
Kim et al.

(10) Patent No.: US 9,779,547 B2
(45) Date of Patent: Oct. 3, 2017

(54) TESSELLATION METHOD FOR ASSIGNING A TESSELLATION FACTOR PER POINT AND DEVICE PERFORMING THE METHOD

(71) Applicant: SAMSUNG ELECTRONICS CO., LTD., Suwon-si, Gyeonggi-Do (KR)

(72) Inventors: Seok Hoon Kim, Suwon-si (KR); Yong Ha Park, Seongnam-si (KR); Chang Hyo Yu, Yongin-si (KR); Kil Whan Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 157 days.

(21) Appl. No.: 14/310,351

(22) Filed: Jun. 20, 2014

(65) Prior Publication Data
US 2015/0015580 A1 Jan. 15, 2015

(30) Foreign Application Priority Data
Jul. 9, 2013 (KR) ........................ 10-2013-0080048

(51) Int. Cl.
*G06T 15/00* (2011.01)
*G06T 17/20* (2006.01)
*G06T 15/04* (2011.01)
*G06T 11/40* (2006.01)

(52) U.S. Cl.
CPC ............ *G06T 17/20* (2013.01); *G06T 15/005* (2013.01); *G06T 11/40* (2013.01); *G06T 15/04* (2013.01); *G06T 17/205* (2013.01)

(58) Field of Classification Search
CPC ....... G06T 17/20; G06T 17/205; G06T 15/04; G06T 15/005; G06T 11/40
See application file for complete search history.

(56) References Cited

U.S. PATENT DOCUMENTS

| 6,707,452 | B1 |   | 3/2004  | Veach |
|-----------|----|---|---------|-------|
| 6,784,884 | B1 |   | 8/2004  | Hsieh |
| 6,940,503 | B2 |   | 9/2005  | Vlachos et al. |
| 6,940,505 | B1 |   | 9/2005  | Savine et al. |
| 7,142,206 | B1 | * | 11/2006 | Moreton ................. G06T 17/30 345/419 |
| 7,446,777 | B2 | * | 11/2008 | Breneman ............... G06T 15/06 345/581 |
| 7,768,511 | B2 |   | 8/2010  | Fenney |
| 7,903,112 | B2 |   | 3/2011  | Yamada |
| 7,928,979 | B2 | * | 4/2011  | Patel ....................... G06T 17/20 345/423 |

(Continued)

FOREIGN PATENT DOCUMENTS

| KR | 1020110072462 | 6/2011 |
|----|---------------|--------|
| WO | 02095687 | 11/2002 |

OTHER PUBLICATIONS

UK Search Report issued Jan. 9, 2015 corresponding to UK Patent Application No. 1412090.1.

*Primary Examiner* — Abderrahim Merouan
(74) *Attorney, Agent, or Firm* — F. Chau & Associates, LLC

(57) ABSTRACT

A tessellation method includes assigning a tessellation factor to each of a plurality of points in a patch and generating, in the vicinity of a first point of the plurality of points, at least one new point based on a first tessellation factor assigned to the first point. The at least one first new point corresponds to the first point.

21 Claims, 14 Drawing Sheets

(56) References Cited

U.S. PATENT DOCUMENTS

| | | | |
|---|---|---|---|
| RE42,534 E | 7/2011 | Sfarti | |
| 8,144,147 B2 | 3/2012 | Munkberg et al. | |
| 8,537,158 B2 | 9/2013 | Gong | |
| 8,605,085 B1* | 12/2013 | Moreton | G06T 17/20 345/419 |
| 2005/0248567 A1* | 11/2005 | Kim | G06T 17/20 345/419 |
| 2009/0189898 A1* | 7/2009 | Dammertz | G06T 15/06 345/426 |
| 2009/0237400 A1* | 9/2009 | Patel | G06T 17/20 345/423 |
| 2009/0237401 A1 | 9/2009 | Wei et al. | |
| 2010/0079454 A1 | 4/2010 | Legakis et al. | |
| 2010/0164954 A1 | 7/2010 | Sathe et al. | |
| 2010/0214294 A1* | 8/2010 | Li | G06T 17/20 345/423 |
| 2011/0027426 A1* | 2/2011 | Belloli | A23F 3/32 426/79 |
| 2011/0057931 A1 | 3/2011 | Goel et al. | |
| 2011/0080405 A1* | 4/2011 | Moreton | G06T 17/20 345/423 |
| 2011/0085736 A1* | 4/2011 | Dmitriev | G06T 17/20 382/199 |
| 2011/0310102 A1* | 12/2011 | Chang | G06T 17/20 345/423 |
| 2012/0182298 A1* | 7/2012 | Sun | G06T 17/005 345/423 |
| 2013/0154974 A1* | 6/2013 | Murata | G06F 3/0412 345/173 |
| 2013/0162651 A1* | 6/2013 | Martin | G06T 17/20 345/441 |
| 2013/0257891 A1* | 10/2013 | Sathe | G06T 15/005 345/589 |

* cited by examiner

FIG. 5

| | | | | | | 119-1 |
|---|---|---|---|---|---|---|
| Vertex 0 | PST 0 | CLR 0 | NORMAL 0 | Tex_coord 0 | ••• | TF0 |
| Vertex 1 | PST 1 | CLR 1 | NORMAL 1 | Tex_coord 1 | ••• | TF1 |
| Vertex 2 | PST 2 | CLR 2 | NORMAL 2 | Tex_coord 2 | ••• | TF2 |
| Vertex 3 | PST 3 | CLR 3 | NORMAL 3 | Tex_coord 3 | ••• | TF3 |

TESSELLATION METHOD FOR ASSIGNING A TESSELLATION FACTOR PER POINT AND DEVICE PERFORMING THE METHOD

CROSS-REFERENCE TO RELATED PATENT APPLICATION

This application claims priority under 35 U.S.C. §119 to Korean Patent Application No. 10-2013-0080048 filed on Jul. 9, 2013, in the Korean Intellectual Property Office, the disclosure of which is incorporated by reference herein.

TECHNICAL FIELD

The present inventive concept relates to tessellation, and more particularly to a method for assigning a tessellation factor per point and a device performing the method.

DISCUSSION OF THE RELATED ART

In computer graphics, tessellation is used to manage datasets presenting objects in a scene and divide them into structures for rendering.

When a tessellation factor is assigned to each face, a crack may occur between two faces (e.g., edge-shared faces) having different tessellation factors.

To prevent such crack, a tessellation factor may be assigned to each edge. However, another type of crack may occur between two faces (e.g., point-shared faces) having different tessellation factors.

SUMMARY

According to an exemplary embodiment of the present invention, a method of tessellating surfaces in a graphics pipeline by a graphic processor is provided. The method includes assigning a tessellation factor to each of points in a patch and generating, in the vicinity of a first point of the plurality of points, at least one new first point based on a first tessellation factor assigned to the first point. The at least one first new point corresponds to the first point.

The tessellation factor assigned to each of the points may be an integer equal to or larger than zero, or a decimal.

The vicinity of the first point may be the first point, an edge including the first point, or a face including the first point.

The tessellation factor assigned to each of the points may be an integer larger than zero, or a decimal.

The at least one first new point may not be generated when the first tessellation factor is a predetermined value.

The predetermined value may be zero.

The at least one first new point may be generated at a portion of an edge and a second new point corresponding to a second tessellation factor assigned to the second point may not be generated at the edge when the first point and a second point share the edge.

Each of the plurality of points may represent geometric data including at least one of a position and a normal vector.

Each of plurality of the points may represent a vertex having attributes including a position, a normal vector, and a texture coordinate.

The surfaces may be parametric surfaces, subdivision surfaces, triangle meshes, or curves.

The method may further include generating topology information including connectivity relationship between the at least one first new point and the first point and generating at least one primitive using the topology information when a crack occurs.

The tessellation factor may be obtained by receiving from an external source or by calculation according to an algorithm.

According to an exemplary embodiment of the present invention, a device is provided. The device includes a Hull shader and a tessellator. The Hull shader is configured to assign a tessellation factor to each of plurality of points in a patch. The tessellator is configured to generate, in the vicinity of a first point of the plurality of points, at least one first new point based on a first tessellation factor assigned to the first point.

According to an exemplary embodiment of the present invention, a graphics processor is provided. The graphic processor is configured to assign a tessellation factor to each of plurality of points in a patch and to generate at least one first new point based on a first tessellation factor assigned to the first point.

According to an exemplary embodiment of the present invention, an apparatus is provided. The apparatus includes a graphics processor and a display. The display is configured to display signals processed by the graphics processor. The graphics processor includes a Hull shader and a tessellator. The Hull shader is configured to assign a tessellation factor to each of a plurality of points in a patch. The tessellator is configured to generates, in the vicinity of a first point of the plurality of the points, at least one first new point based on a first tessellation factor assigned to the first point. The at least one first new point corresponds to the first point.

According to an exemplary embodiment of the present invention, a method of tessellating surfaces in a graphics pipeline by a graphic processor is provided. The method includes assigning a tessellation factor to each of a plurality of points in a patch, generating, in the vicinity of a first point of the plurality of points, at least one first new point based on a first tessellation factor assigned to the first point, and outputting coordinates of the at least one first new point and topology information to a domain shader. A number of the at least one first new point corresponds to the first tessellation factor, and the at least one first new point corresponds to the first point.

BRIEF DESCRIPTION OF THE DRAWINGS

The aforementioned aspects of the present inventive concept will become apparent and more readily appreciated by describing in detail exemplary embodiments thereof, taken in conjunction with the accompanying drawings in which:

FIGS. 5 and 6 are memories storing the tessellation factor assigned per point;

FIG. 13A is a diagram when a method of assigning the tessellation factor per edge as a comparison example is used and FIG. 13B is a diagram when a method of assigning the tessellation factor per point according to an exemplary embodiment of the present inventive concept is used.

DETAILED DESCRIPTION OF THE EMBODIMENTS

Figure 1:
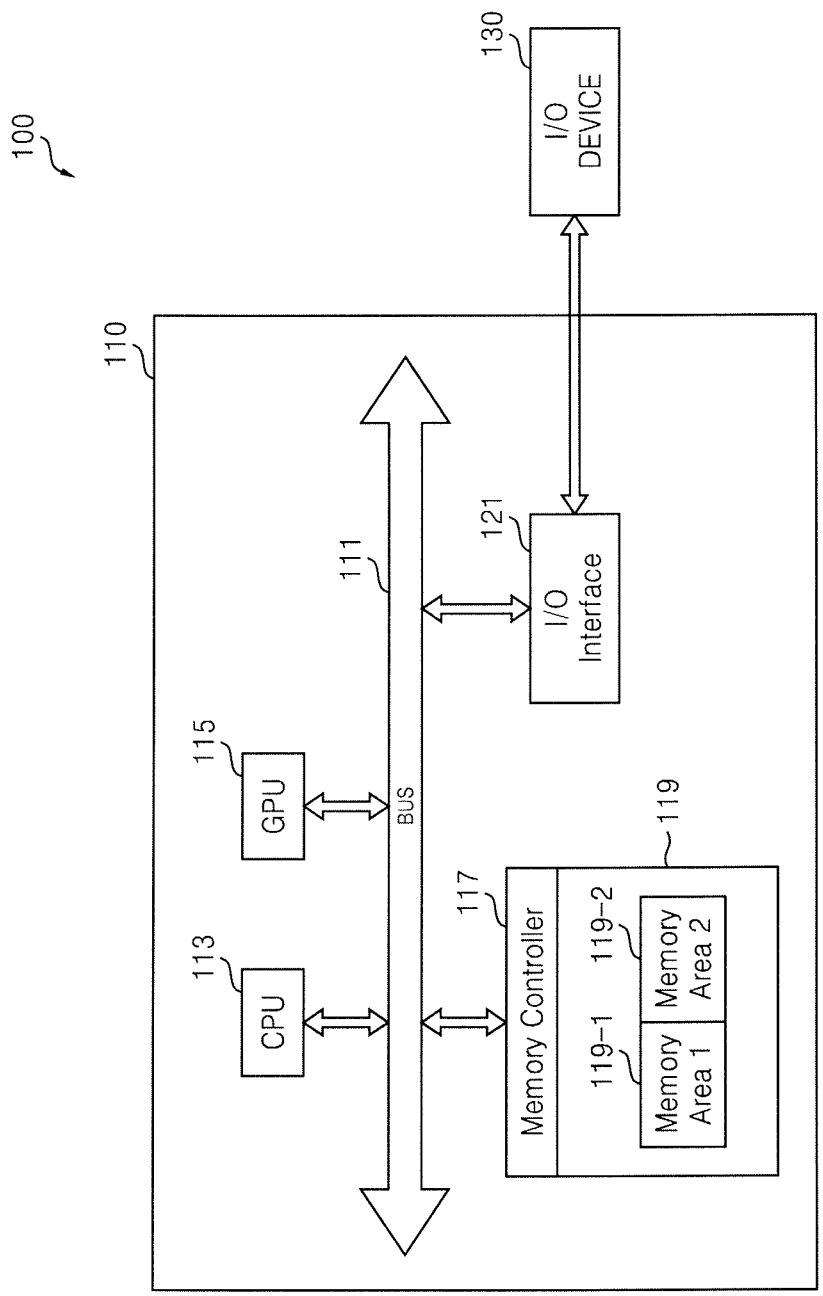
FIG. 1 is a block diagram of an electronic system according to an exemplary embodiment of the present inventive concept.

The present inventive concept now will be described more fully hereinafter with reference to the accompanying drawings, in which embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers may refer to like elements throughout.

FIG. 1 is a block diagram of an electronic system according to an exemplary embodiment of the present inventive concept. Referring to FIG. 1, an electronic system 100 may include a processing device 110 and an input/output device 130.

The electronic system 100 may be embodied in a personal computer (PC), a two-dimensional TV, a three-dimensional TV, a portable electronic device, or the like. The portable electronic device may be embodied in a laptop computer, a smart phone, a tablet PC, a personal digital assistant (PDA), a portable multimedia player (PMP), a handheld game console, a mobile internet device (MID), or the like.

The processing device 110 may be embodied in a printed circuit board (PCB), a system on chip (SoC), an application processor, or the like.

The processing device 110 includes a bus 111, a central processing unit (CPU) 113, a graphics processing unit (GPU) 115, a memory controller 117, a memory 119, and an input/output interface 121.

The CPU 113 may control the GPU 115, the memory controller 117, and the input/output interface 121 through the bus 111. The CPU 113 may execute an application, e.g., a 3D application such as a 3D game.

As the 3D application is executed, the 3D application outputs 3D application programming interface (API) commands. According to the 3D API commands, a 3D API, e.g., OpenGL™ or Direct3D™, used in applications may be executed to render a 3D computer graphics.

The GPU 115 may process data stream related to computer graphics according to a control of the CPU 113. The GPU 220 is an example of a graphics processor including a graphic pipeline.

The GPU 115 may assign each of tessellation factor to each of points and may generate new points (e.g., tessellated points) TDP) in the vicinity of each of the points. For example, vicinity of a corresponding point may include the corresponding point among the points, a face including the corresponding point, or an edge including the corresponding point. Further, the GPU 115 may generate a primitive pattern(s) using the points and the new point(s). The new point(s) may be generated based on the tessellation factor assigned to a point.

In the present inventive concept, the new point(s) means one or more new points, the primitive pattern(s) means primitive patterns, and the tessellated point(s) means one or more tessellated points.

For example, when a specific tessellation factor assigned to a specific point includes zero or information that indicates not to generate any more new point, new point(s) might not be generated in the vicinity of the specific point.

A point in the present inventive concept may denote a vertex included in an input patch or an input control point ICP. The input patch may denote a quad patch, a tri patch, or an isoline.

The memory controller 117 may write data to the memory 119 or read data from the memory 119 under the control of the CPU 113 or the GPU 115.

The memory 119 may store data to be processed (or which are already processed) in the CPU 113 or the GPU 115, and may be embodied in a volatile memory and/or a non-volatile memory.

The memory 119 may store an operating system (OS), application programs, other program modules, and/or program data. According to an exemplary embodiment, the memory 119 may be used a system memory.

In addition, the memory 119 may store API for assigning the tessellation factor per point according to an exemplary embodiment of the present inventive concept.

In FIG. 1, it is illustrated that the memory 119 is embedded in the processing device 110. However, the memory 119 may be embodied outside the processing device 110 and the present inventive concept is not limited thereto.

The memory 119 embodied outside the processing device 110 may be embodied in a dynamic random access memory (DRAM), a hard disk drive (HDD), a solid state drive (SSD), a removable storage media, a non-removable storage media, or the like. For example, the memory 119 embodied outside may be embodied in a universal flash storage (UFS), an embedded multimedia card (eMMC), a universal serial bus (USB) flash drive, or the like.

The processing device 110 may communicate with the input/output device 130 through the input/output interface 121. The input/output device 130 may be embodied in a flat display which may display computer graphics. The flat display may display signals processed by the GPU 115.

Figure 2:
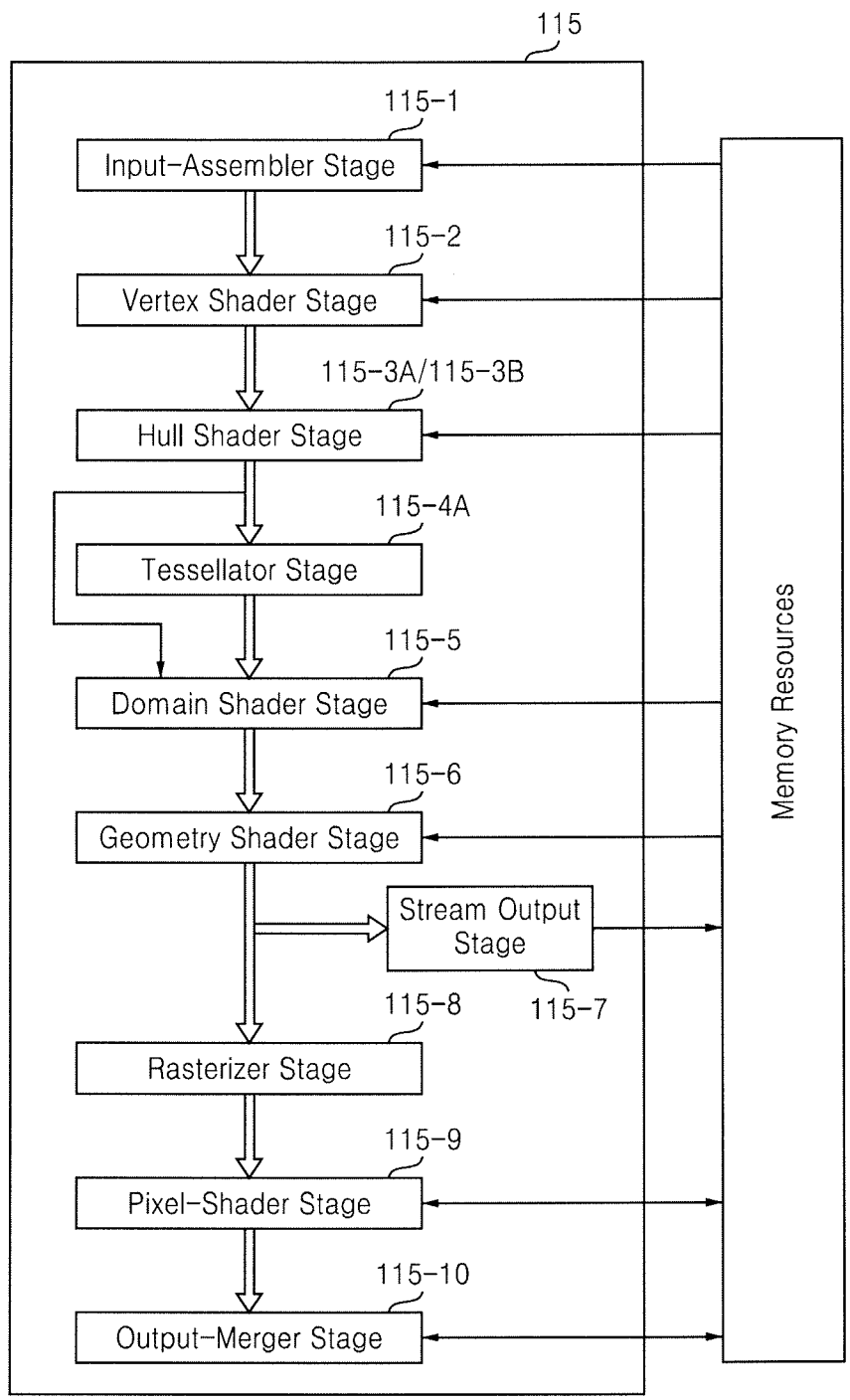
FIG. 2 is an exemplary embodiment of a pipeline of a graphic processing unit (GPU) illustrated in FIG. 1.

FIG. 2 is an exemplary embodiment of a pipeline of the graphics processing unit illustrated in FIG. 1. Functions and operations of stages 115-1, 115-2, and 115-5 to 115-10 are substantially the same as those having the same names included in a graphic pipeline of Microsoft™ Direct3D™ 11. Accordingly, a detailed description on the stages 115-1, 115-2, and 115-5 to 115-10 is omitted. Hereinafter, stages 115-3A/115-3B and 115-4A according to an exemplary embodiment of the present inventive concept will be described in more detail with reference to FIG. 2.

Referring to FIG. 2, the stages 115-3A/115-3B and 115-4A may be used in various graphics pipelines for assigning a tessellation factor per point and performing a tessellation operation using the tessellation factor assigned per point.

The memory resources of FIG. 2 may be a memory 119 or an additional memory (not shown) which may be accessed by the GPU 115.

Figure 3:
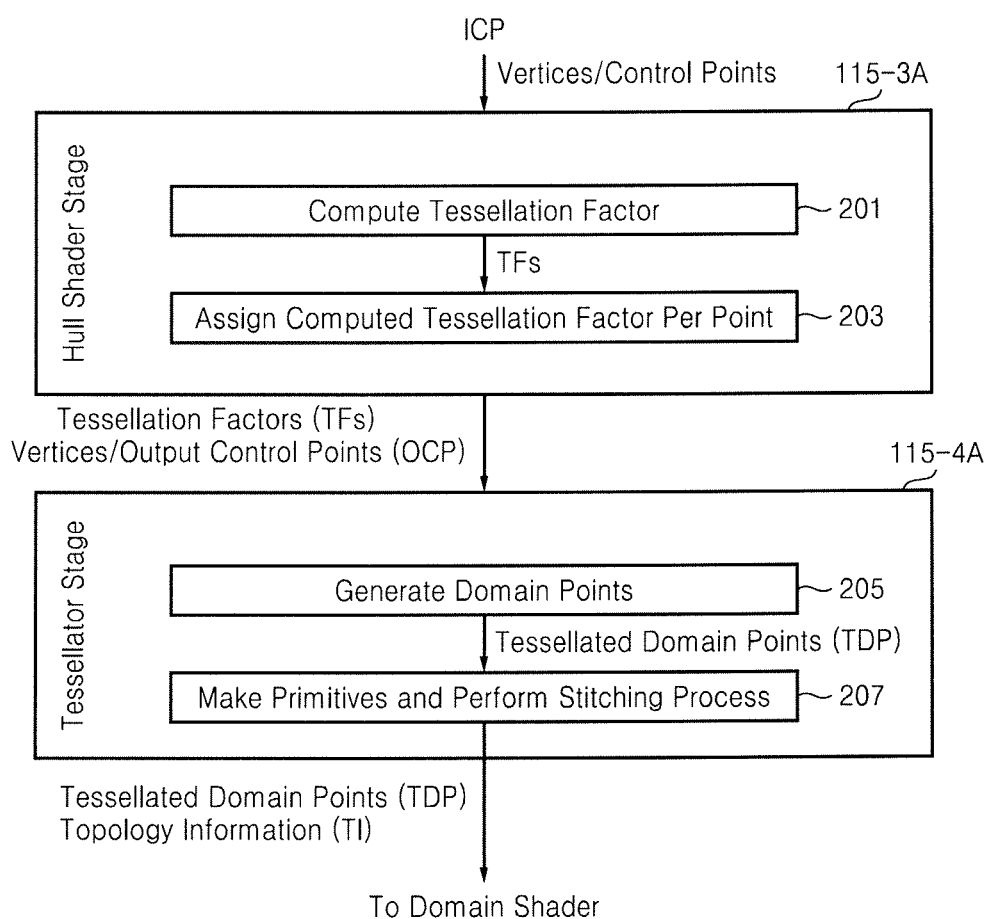
FIG. 3 is a diagram for describing an operation of a Hull shader and a tessellator according to an exemplary embodiment of the present inventive concept.

FIG. 3 is a diagram for describing an operation of the Hull shader and the tessellator according to an exemplary embodiment of the present inventive concept.

Referring to FIGS. 2 and 3, the Hull shader 115-3A may calculate the tessellation factor to be assigned to each of the input points ICP (e.g., input vertices or input control points) (201).

The tessellation factor denotes a level of detail (LOD), and may be an integer, decimal, or a decimal fraction. The tessellation factor may be an integer which is not zero.

In the Hull shader 115-3A, the tessellation factor may be calculated using various algorithms. One of the various algorithms may include a depth comparison algorithm. For example, according to a user-defined criteria or a user-defined algorithm, a large tessellation factor may be set to a point that is close to a virtual eye of an user and a small tessellation factor may be set to a point that is distant from the virtual eye.

Figure 4:
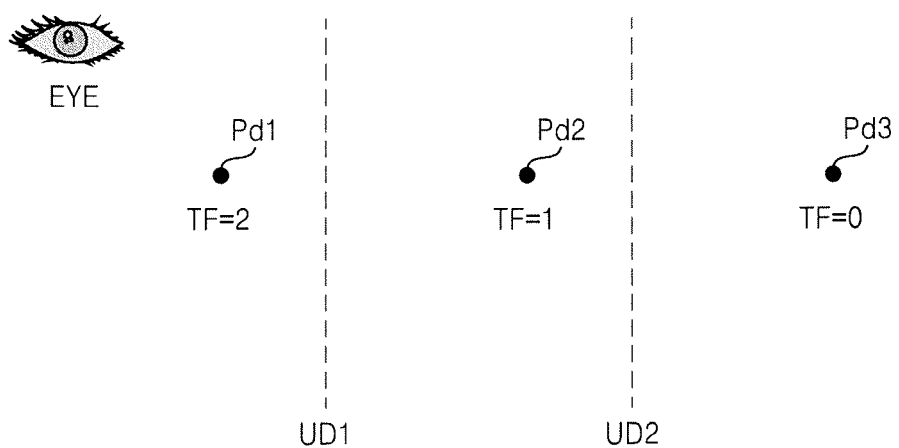
FIG. 4 is a diagram for describing a method of calculating a tessellation factor per point.

Referring to FIG. 4, the Hull shader 115-3A may set the tessellation factor TF to 2 when a depth value of a point Pd1 is smaller than a first reference depth value UD1, may set the tessellation factor TF to 1 when a depth value of a point Pd2 is present between the first reference depth value UD1 and a second reference depth value UD2, and may set the tessellation factor TF to 0 when a depth value of a point Pd3 is larger than the second reference depth value UD2. For example, each of the points Pd1, Pd2, and Pd3 may be a virtual point.

Another one of the various algorithms is a curvature comparison algorithm. The curvature may be calculated using various methods.

The tessellation factor calculated by the Hull shader 115-3A is finally assigned per point (203). An assignment operation is performed during a tessellation process of tessellating surfaces.

The surfaces include parametric surfaces, subdivision surfaces, triangle meshes, or curves. An appearance of a realistic three-dimensional object may be represented using the surfaces.

The tessellation factor in the related art may be assigned per edge. The tessellation factor is assigned per point according to an exemplary embodiment of the present inventive concept. For example, one tessellation factor may be assigned per edge in the related art. Two tessellation factors may be assigned per edge in the present inventive concepts. Thus, the tessellation method according to an exemplary embodiment of the present inventive concept may perform more accurate and adaptive tessellation than the methods of assigning the tessellation factor per edge or face.

According to an exemplary embodiment the present inventive concept, output points OCP output from the Hull shader 115-3A and the tessellation factors TFs each assigned to each of the output points OCP may be provided to a tessellator 115-4A. The output points OCP may be vertices or control points.

The Hull shader 115-3A may transform a set of the input points ICP to a set of the output points OCP. According to an exemplary embodiment of the present inventive concept, each of the input points ICP may correspond to each of the output pints OCP and. Further, the number of the input points ICP and the number of the output points OCP may be the same as each other. Alternatively, the number of the input points ICP and the number of the output points OCP may be different from each other. For example, the number of the output points OCP may be changed according to a way of being programmed in the Hull shader 115-3A.

For convenience of description, it is assumed that the number of the input points ICP is the same as the number of the output points OCP. However, the present inventive concept may also be applied to the case where the number of the input points ICP is different from the number of the output points OCP. Thus, points included in a patch according to an exemplary embodiment of the present inventive concept are interpreted as the input points ICP or the output points OCP.

Referring back to FIG. 2, the Hull shader 115-3A may output the output points OCP and patch constant data to the domain shader 115-5. The patch constant data may include the tessellation factor assigned per point and values related to a patch equation used in a tessellation pipeline.

The tessellation pipeline includes the Hull shader (or Hull shader stage) 115-3A or 115-3B, the tessellator (or tessellator stage) 115-4A, and the domain shader (or domain shader stage) 115-5.

For example, the patch equation may be a curve equation, a surface equation, or the like. For example, the curve equation may be Hermite curve equation, Bezier curve equation, NURBS curve equation, B-spline curve equation, or the like.

The values related to the patch equation may be coefficients in the patch equation.

The Hull shader 115-3A may generate output values (e.g., tessellation factors TF and output points OCP) for the input points ICP according to programmed criteria. For example, the output values may include a patch equation corresponding to the input points ICP, the output points OCP, or each of the tessellation factors TF assigned to each of the points ICP and OCP.

The generated output values of the Hull shader 115-3A may be output to the tessellator 115-4A.

According to an exemplary embodiment of the present inventive concept, the tessellation factor assigned to each of the points (e.g., input points ICP or output points OCP) may be stored in advance in a first memory region 119-1 according to a control of the GPU 115 and the memory controller 117 before tessellation process is performed on the each of the points. In this case, each tessellation factor assigned to each of the points ICP or OCP stored in the first memory region 119-1 may be provided to the tessellator 115-4A.

As illustrated in FIG. 5, the tessellation factor assigned or to be assigned to each of the output points OCP may be stored in the first memory region 119-1 that stores attributes for each of the output points OCP. For example, attributes of each vertex Vertex0 to Vertex3 corresponding to each output point include each position PST0 to PST3, each color CLR0 to CLR3, each normal vector NORMAL0 to NORMAL3, each texture coordinates Tex_coord0 to Tex_coord3, and each tessellation factor TF0 to TF3.

Each color CLR0 to CLR3 may be RGB data, YUV data, YCbCr data, or YCoCg data. Each output point may indicate geometric data including a position or a normal vector. In addition, each output point may indicate a vertex having attributes including the position, the normal vector, or texture coordinates in a three-dimensional graphics pipeline.

Figure 6:
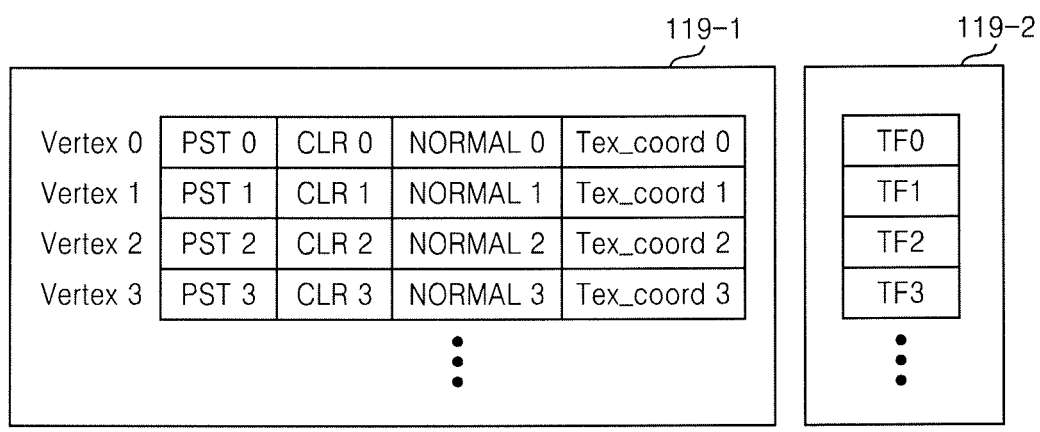

As illustrated in FIG. 6, the tessellation factor assigned or to be assigned to each of the output points OCP may be stored in a second memory region 119-2 which is different from the first memory region 119-1 storing attributes for each of the output points OCP.

Referring to FIG. 3, the tessellator 115-4A may generate a new point(s), which corresponding to each of the output points OCP, by using the output points OCP and the tessellation factor assigned to each of the output points OCP (205).

The tessellator 115-4A may generate primitive patterns using the output points OCP and/or the generated new points, and may perform a stitching process to remove a crack when the crack occurs (207).

The tessellator 115-4A may output the primitive patterns and topology information TI to the domain shader 115-5. The primitive patterns may include UV coordinates (or UVW coordinates) of tessellated domain points TDP (e.g., tessellated domain points or new points) and the topology information TI may define connectivity relationship between the UV coordinates (or the UVW coordinates). According to an exemplary embodiment of the present inventive concept, the output points OCP may be transmitted to the domain shader 115-5 together with the primitive patterns.

Figure 7:
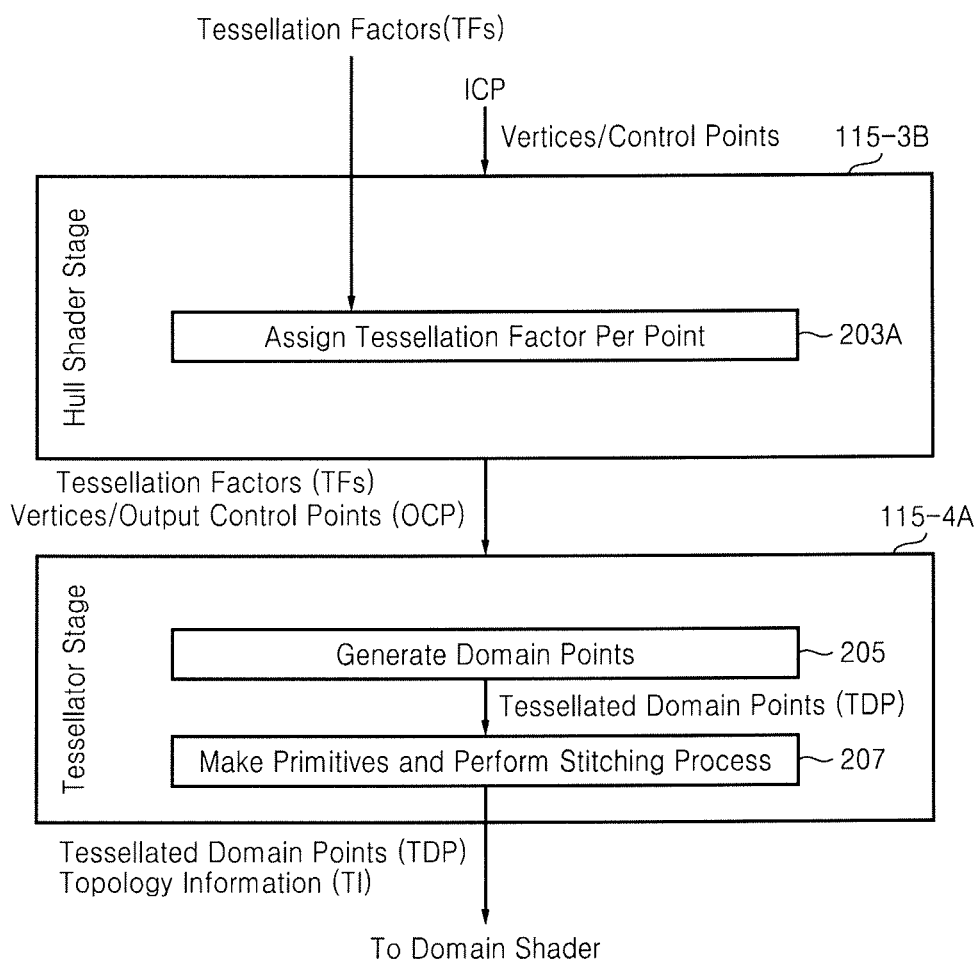
FIG. 7 is an diagram for describing an operation of the Hull-shader and the tessellator according to an exemplary embodiment of the present inventive concept.

FIG. 7 is a diagram for describing an operation of the Hull shader and the tessellator according to an exemplary embodiment of the present inventive concept.

Referring to FIGS. 2 and 7, a Hull shader 115-3B may receive the input points ICP and the tessellation factors TF, and may assign each of the tessellation factors TFs to each of the output points OCP (203A).

Referring back to FIG. 7, the tessellator 115-4A may generate one or more new points corresponding to each of the output points OCP by using each of the output points OCP output from the Hull shader 115-B and the tessellation factor assigned to each of the output points OCP (205).

The tessellator 115-4A may generate the primitive patterns by using each of the output points OCP and each of the generated new points, and may perform a stitching process to remove a crack when the crack occurs (207).

The tessellator 115-4A may transmit the primitive patterns and topology information TI to the domain shader 115-5. The primitive patterns may include UV coordinates (or UVW coordinates) of tessellated domain points TDP by the tessellator 115-4A and the topology information TI may define connectivity relationship between the UV coordinates (or the UVW coordinates). According to an exemplary embodiment of the present inventive concept, the output points OCP may be transmitted to the domain shader 115-5 together with the primitive patterns.

When an input patch including the input points ICP is included in a parametric surface, the tessellator 115-4 may generate the tessellated domain points TDP by using each of the output points OCP and each of the tessellation factors assigned to each of the output points OCP.

When the input patch including the input points ICP is included in a sub-division surface or a triangle mesh, the tessellator 115-4 may refine each of basic meshes using each of the output points OCP and each of the tessellation factor assigned to each of the output points OCP.

FIGS. 8 to 12 are diagrams for describing an operation of the Hull shader and the tessellator according to an exemplary embodiment of the present inventive concept.

Referring to FIGS. 1 to 3, 7 and 8, the Hull shader 115-3A or 115-3B receives first to third input points P1, P2, and P3. For example, the first to third input points P1, P2, and P3 may be included an input patch or an input primitive.

As described above, since it is assumed that each of the output points OCP corresponds to each of the input points ICP, hereinafter "a point" means an input point or an output point.

Figure 8A:
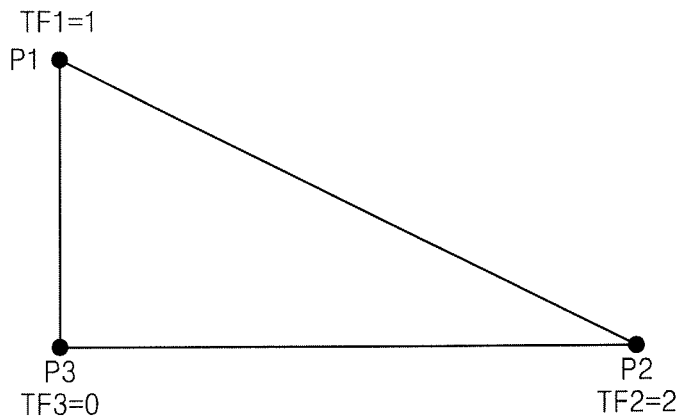
FIGS. 8A to 8C, 9A to 9C, 10A to 10C, 11A to 11C, and 12A to 12C are diagrams for describing an operation of the Hull-shader and the tessellator according to an exemplary embodiment of the present inventive concept.

As illustrated in FIGS. 3 and 8A, the Hull shader 115-3A may calculate the tessellation factors TF1, TF2, and TF3 for each of points P1, P2, and P3 by using various algorithms, and may assign each of the tessellation factors TF1, TF2, and TF3 to each of the points P1, P2, and P3.

As illustrated in FIGS. 7 and 8A, the Hull shader 115-3B may receive tessellation factors TF1, TF2, and TF3 for each of points P1, P2, and P3 from an external device (e.g., the memory 119), and may assign each of the tessellation factors TF1, TF2, and TF3 to each of the points P1, P2, and P3.

For example, the Hull shader 115-3A or 115-3B may assign a first tessellation factor TF1 (=1) to a first point P1, assign a second tessellation factor TF2 (=2) to a second point P2, and assign a third tessellation factor TF3 (=0) to a third point P3.

Figure 8B:
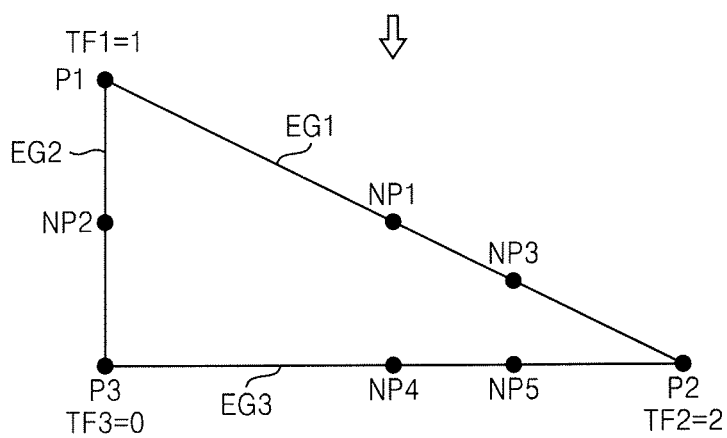

As illustrated in FIG. 8B, the tessellator 115-4A receives points P1, P2, and P3 and tessellation factors TF1, TF2, and TF3 from the Hull shader 115-3A or 115-3B.

The tessellator 115-4A may generate a new point(s) (e.g., a tessellated point(s)) in the vicinity of each of the points P1, P2, and P3. The new point(s) may correspond to each of the tessellation factors TF1, TF2, and TF3. The "vicinity' of each of the points P1, P2, and P3, for example, the 'vicinity' of the first point P1 may be the first point P1 itself, an edge (e.g., EG1 or EG2) including the first point P1, or a face including the first point P1.

For example, when a tessellation factor having a specific value (e.g., a positive integer or a decimal), which is not 0, is assigned to a specific point, the tessellator 115-4A may generate a new point(s) having the same number as the specific value or a new point(s) with different number from the specific value according to a program programmed in the tessellator 115-4A.

For example, when the tessellation factor assigned to the specific point is N (a positive integer equal to or greater than 2), the tessellator 115-4A may generate N new points which is the same number as the specific value of the tessellation factor, according to program programmed in the tessellator 115-4A. Alternatively, the tessellator 115-4A may generate 2N new points, or (N−1) new point(s) which is different number from the specific value, according to the program programmed in the tessellator 115-4A.

When each of the points P1, P2, and P3 is included in a patch of the parametric surface, the tessellator 115-4A may generate a tessellated domain point(s) that corresponds to the tessellation factors TF1, TF2, and TF3 each assigned to each of the points P1, P2, and P3.

When each of the points P1, P2, and P3 is included in a patch of the sub division surface or a patch of the triangle mesh, the tessellator 115-4A may refine each of the basic meshs using the tessellation factors TF1, TF2, and TF3.

For convenience of description, the tessellator 115-4A is assumed to generate a new point(s) in an order of the first point P1, the second point P2, and the third point P3. However, the order may be changed according to embodiments.

For example, the tessellator 115-4A may generate a first new point NP1 at a midpoint of a first edge EG1 and a second new point NP2 at a midpoint of a second edge EG2 by using the first tessellation factor TF1 (=1) assigned to the first point P1.

The tessellator 115-4A may generate a third new point NP3 at a midpoint of the new point NP1 and a second point P2 and fourth and fifth new points NP4 and NP5 at a midpoint of a third edge EG3 by using the second tessellation factor TF2(=2) assigned to the second point P2.

For example, the new points (e.g., NP1 and NP3) for a current point (e.g., the second point P2) may include the point NP1 generated by using the first tessellation factor TF1 assigned to a previous point (e.g., the first point P1). For example, the new point NP1 may be a point generated by using the first tessellation factor TF1 (=1) and may be a point generated by using the second tessellation factor TF2 (=2).

When the previous point (e.g., the first point P1) and the current (e.g., second point P2) share a first edge EG1, the first new point NP1 corresponding to the first tessellation factor TF1 (=1) assigned to the previous point (e.g., the first point P1) may be generated at a portion of the first edge EG1, and new points (e.g., NP1 and NP3) corresponding to the second tessellation factor TF1 (=2) assigned to the current point (e.g., the second point P2) may be generated at the rest of the first edge EG1.

Here, when the new point NP1 for the previous point (e.g., the first point P1) is already generated, the tessellator 115-4A might not repeatedly generate the new point (e.g., NP1) for the current point P2.

When a new point(s) at each edge EG1, EG2, and EG3 are generated, the tessellator 115-4A may generate connectivity information (e.g., topology information) depicting connectivity relationship among the points P1, P2, and P3, and/or the new points NP1 to NP5. The connectivity information may be used in the stitching process.

Figure 8C:
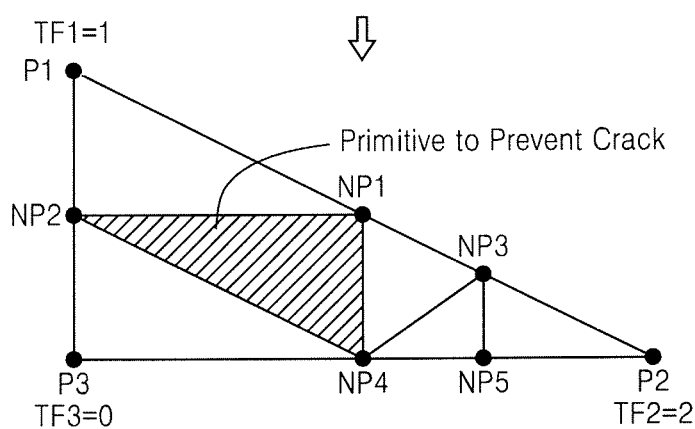

As illustrated in FIG. 8C, the tessellator 115-4A may generate primitive patterns or primitives based on the generated connectivity information. Here, when a crack is generated (or occurred), the tessellator 115-4A may generate a primitive to remove the crack. For example, the primitive may include generated new points (e.g., NP1, NP2, and NP4).

Figure 9A:
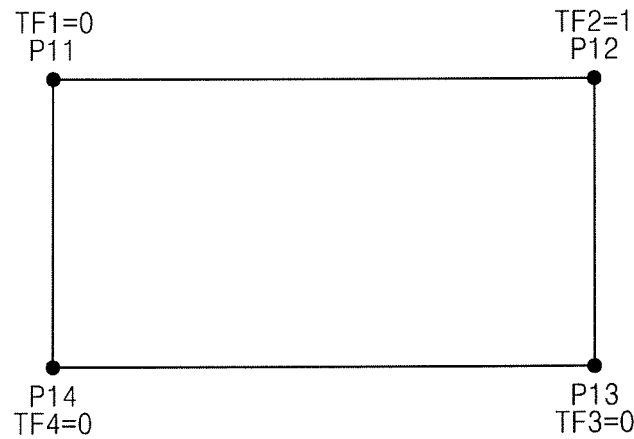

As illustrated in FIGS. 3 and 9A, the Hull shader 115-3A may calculate tessellation factors TF1, TF2, TF3, and TF4 for each of points P11, P12, P13, and P14 using various algorithms, and may assign each of the tessellation factors TF1, TF2, TF3, and TF4 to each of the points P11, P12, P13, and P14.

As illustrated in FIGS. 7 and 9A, a Hull shader 115-3B may receive tessellation factors TF1, TF2, TF3, and TF4 for each point P11, P12, P13, and P14 from outside, and may assign each of the tessellation factors TF1, TF2, TF3, and TF4 to each of the point P11, P12, P13, and P14.

For example, the Hull shader 115-3A assigns a first tessellation factor TF1 (=0) to a first point P11, assigns a second tessellation factor TF2 (=1) to a second point P12, assigns a third tessellation factor TF3 (=0) to a third point P13, and assigns a fourth tessellation factor TF4 (=0) to a fourth point P14.

Figure 9B:
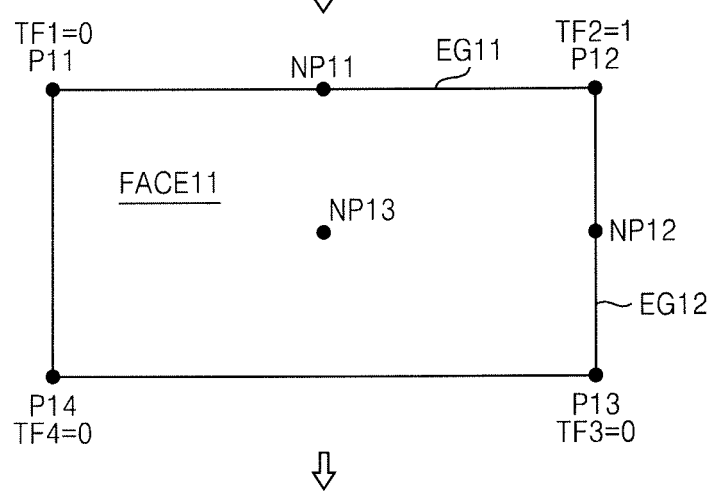

As illustrated in FIG. 9B, the tessellator 115-4A receives the points P11, P12, P13 and P14 and the tessellation factors TF1, TF2, TF3, and TF4 from the Hull shader 115-3A or 115-3B.

Since the first tessellation factor TF1 (=0) is assigned to the first point P11, the tessellator 115-4A does not generate a new point(s) in the vicinity of the first point P11.

The tessellator 115-4A may generate a new point(s) corresponding to the tessellation factor (TF2=1) assigned to a point P12 in the vicinity of the second point P12. For convenience of description, the tessellator 115-4A is assumed to generate a new point(s) in an order of the first point P11, the second point P12, the third point P13, and the fourth point P14. However, the order may be changed according to embodiments.

For example, the tessellator 115-4A may generate a new point NP11 at a midpoint of a first edge EG11, a new point NP12 at a midpoint of a second edge EG12, and a new point NP13 at a center of a surface FACE11 including the second point P12 by using the second tessellation factor TF2 (=1) assigned to the second point P12.

For example, the tessellator 115-4A may generate three new points NP11, NP12, and NP13 in the vicinity (e.g., EG11, EG12, and FACE11) of the second point P12 by using the second tessellation factor TF2(=1) assigned to the second point P12.

When three new points NP11, NP12, and NP13 are generated in the vicinity (e.g., EG11, EG12, and FACE11) of the second point P12, the tessellator 115-4A generates connectivity information (e.g., topology information) depicting connectivity relationship among the points P11, P12, P13, and P14, and/or the new points NP11, NP12, and NP13.

Figure 9C:
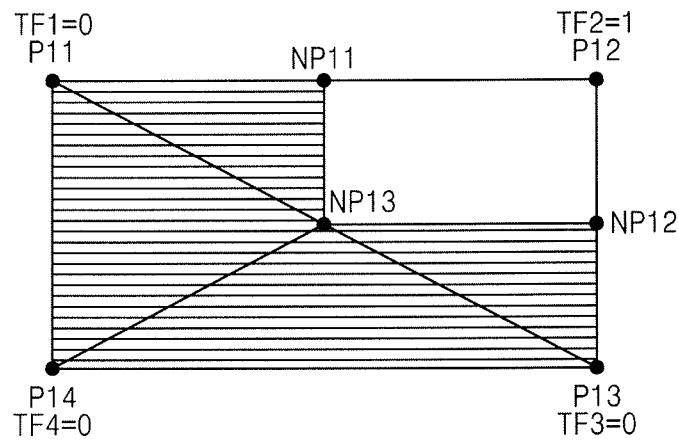

As illustrated in FIG. 9C, the tessellator 115-4A may generate primitives based on the generated connectivity information. For example, when four cracks are generated, the tessellator 115-4A may generate four primitives to remove (or prevent) the four cracks. The four primitives are represented by dotted lines.

Figure 10A:
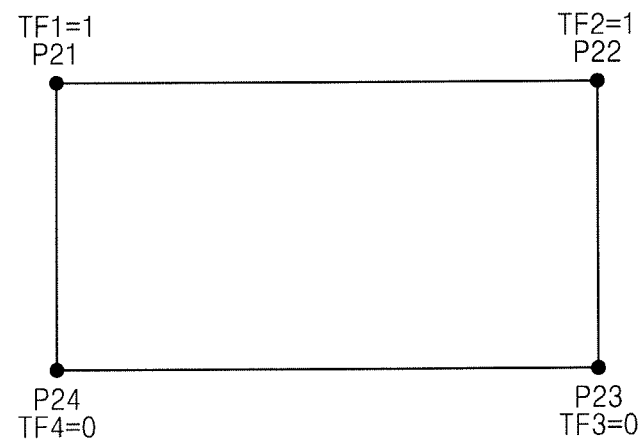

As illustrated in FIGS. 3 and 10A, the Hull shader 115-3A may calculate tessellation factors TF1, TF2, TF3, and TF4 for each of points P21, P22, P23, and P24 by using various algorithms, and may assign each of the tessellation factors TF1, TF2, TF3, and TF4 to each of the points P21, P22, P23, and P24.

As illustrated in FIGS. 7 and 10A, the Hull shader 115-3B may receive tessellation factors TF1, TF2, TF3, and TF4 for each of the point P21, P22, P23, and P24 from outside, and may assign each of the tessellation factors TF1, TF2, TF3, and TF4 to each of the points P21, P22, P23, and P24.

For example, the Hull shader 115-3A or 115-3B assigns a first tessellation factor TF1 (=1) to a first point P21, assigns a second tessellation factor TF2 (=1) to a second point P22, assigns a third tessellation factor TF3 (=0) to a third point P23, and assigns a fourth tessellation factor TF4 (=0) to a fourth point P24.

Figure 10B:
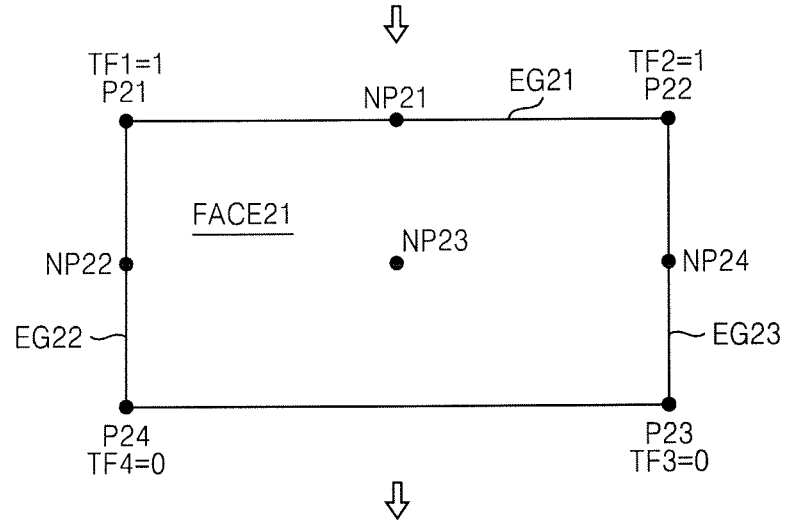

As illustrated in FIG. 10B, the tessellator 115-4A receives the points P21, P22, P23 and P24 and the tessellation factors TF1, TF2, TF3, and TF4 each assigned to each of the points P21, P22, P23, and P24 from the Hull shader 115-3A or 115-3B.

The tessellator 115-4A may generate a new point(s) corresponding to the first tessellation factor (TF1=1) assigned to a point P21 in the vicinity of the first point P21.

For convenience of description, the tessellator 115-4A is assumed to generate a new point(s) in an order of the first point P21, the second point P22, the third point P23, and the fourth point P24. However, the order may be changed according to embodiments.

For example, the tessellator 115-4A generates a new point NP21 at a midpoint of the first edge EG21, generate a new point NP22 at a midpoint of the second edge EG22, and generates a new point NP23 at the center of the face FACE21 including the first point P21.

The tessellator 115-4A may generate a new point NP24 at the midpoint of the third edge EG23 by using the second tessellation factor TF2 (=1) assigned to the second point P22. In this case, since the new point NP21 is already generated at the midpoint of the first edge EG21 and the new point NP23 is already generated at the center of the face FACE21, the tessellator 115-4A might not generate a new point(s) at each of the first edge EG21 and the face FACE21.

The tessellator 115-4A does not generate either a new point corresponding to the third tessellation factor TF3 (=0) assigned to the third point P23 or a new point corresponding to the fourth tessellation factor TF4 (=0) assigned to the fourth point P24.

When the new points NP21, NP22, NP23, and NP24 are generated in the vicinity (e.g., EG21, EG22, EG23, and FACE21) of the points P21 and P22, the tessellator 115-4A generates connectivity information (e.g., topology information) depicting connectivity relationship among the points P21, P22, P23, and P24, and/or the new points NP21, NP22, NP23, and NP24.

Figure 10C:
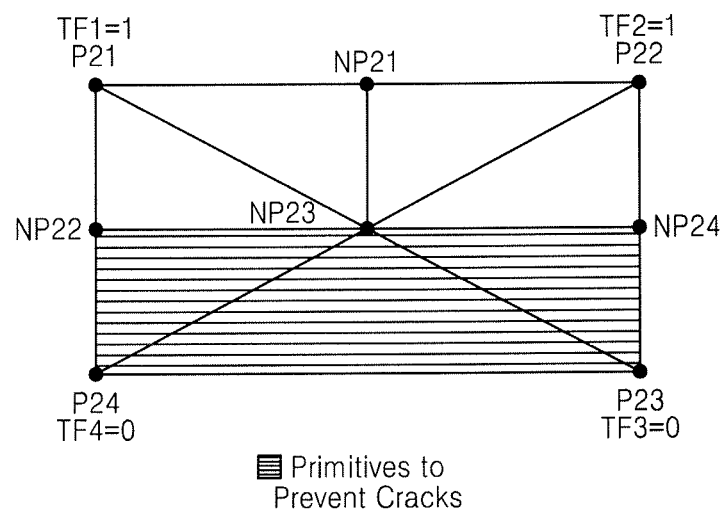

As illustrated in FIG. 10C, the tessellator 115-4A may generate primitives based on the generated connectivity information. For example, when three cracks occur, the tessellator 115-4A may generate three primitives to remove (or prevent) the three cracks. The three primitives are represented by dotted lines.

Figure 11A:
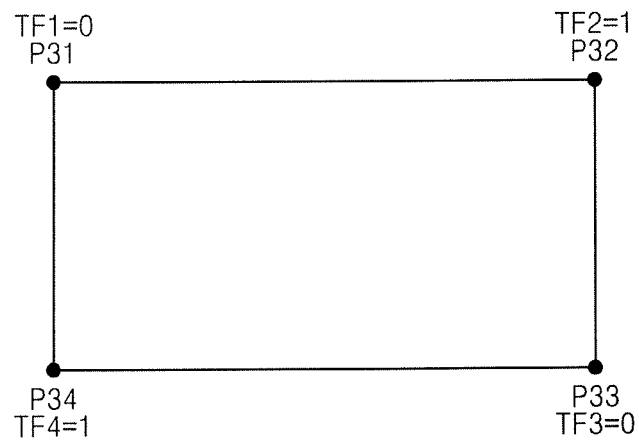

As illustrated in FIGS. 3 and 11A, the Hull shader 115-3A calculates tessellation factors TF1, TF2, TF3, and TF4 for each of points P31, P32, P33, and P34 by using various algorithms, and assigns each of the tessellation factors TF1, TF2, TF3, and TF4 to each of the points P31, P32, P33, and P34.

Referring to FIG. 11A, for example, the Hull shader 115-3A or 115-3B may assign a first tessellation factor TF1 (=0) to a first point P31, may assign a second tessellation factor TF2 (=1) to a second point P32, may assign a third tessellation factor TF3 (=0) to a third point P33, and may assign a fourth tessellation factor TF4 (=1) to a fourth point P34.

Figure 11B:
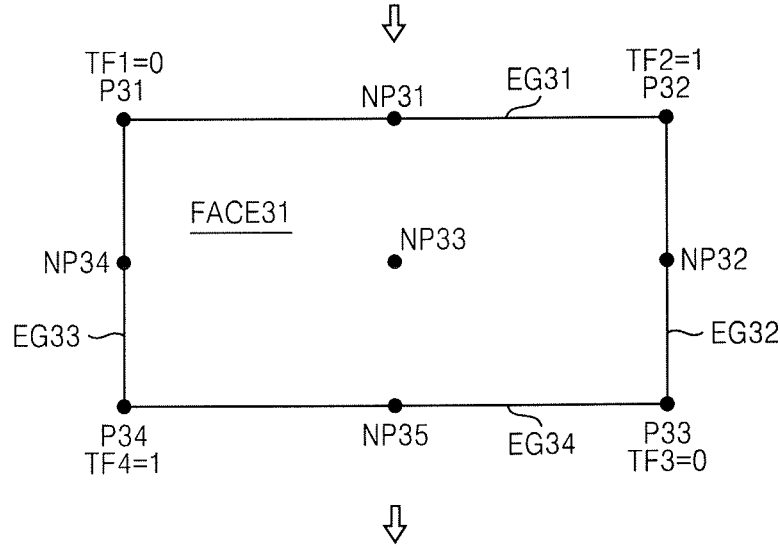

As illustrated in FIG. 11B, the tessellator 115-4A receives points P31, P32, P33 and P34 and the tessellation factors TF1, TF2, TF3, and TF4, each of which is assigned to the each point P31, P32, P33, and P34, from the Hull shader 115-3A or 115-3B.

The tessellator 115-4A may generate a new point(s), which corresponds to a tessellation factor TF2 (=1) assigned to a second point P32, in the vicinity of the second point P32.

For convenience of description, the tessellator 115-4A is assumed to generate a new point(s) in an order of the first point P31, the second point P32, the third point P33, and the fourth point P34. However, the order may be changed according to embodiments of the present inventive concept.

For example, the tessellator 115-4A might not generate a new point based on a tessellation factor TF1 (=0) assigned to the first point P31 in the vicinity of the first point P31.

The tessellator 115-4A may generate a new point NP31 at the midpoint of the first edge EG31 using the second tessellation factor TF2 (=1) assigned to the second point P32, may generate a new point NP32 at the midpoint of the second edge EG32, and may generate a new point NP33 at the center of the face FACE31 including the second point P32.

The tessellator 115-4A might not generate a new point based on the tessellation factor TF3 (=0) assigned to a third point P33 in the vicinity of the third point P33.

The tessellator 115-4A generates a new point NP34 at the midpoint of the third edge EG33 using a fourth tessellation factor TF4 (=1) assigned to the fourth point P34, and generate a new point NP35 at the midpoint of the fourth edge EG34.

For example, since the new point NP33 is already generated at the center of the face FACE31, the tessellator 115-4A might not generate an additional new point on the face FACE31.

When the new points NP31, NP32, NP34, NP35, and NP33 are generated at the in the vicinity (e.g., EG31, EG32, EG33, EG34, and FACE31) of the points P32 and P34, the tessellator 115-4A generates connectivity information (e.g., topology information) depicting connectivity relationship among the points P31, P32, P33, and P34, and/or new points NP31, NP32, NP33, NP34, and NP35.

Figure 11C:
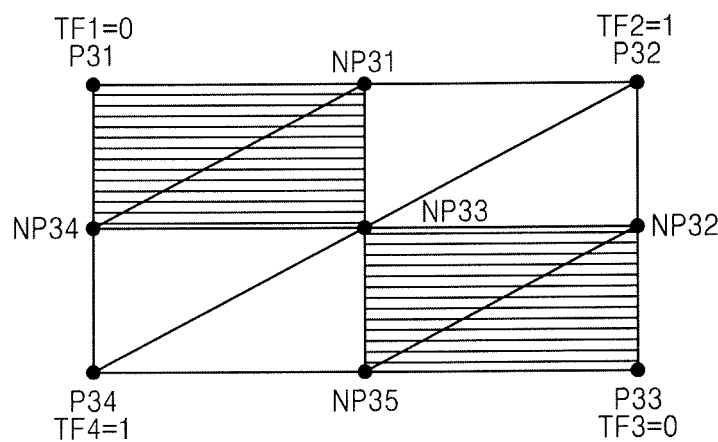

As illustrated in FIG. 11C, the tessellator 115-4A may generate primitives based on the generated connectivity information. For example, when four cracks occur, the tessellator 115-4A may generate four primitives to remove the four cracks. The four primitives are represented by dashed line.

Figure 12A:
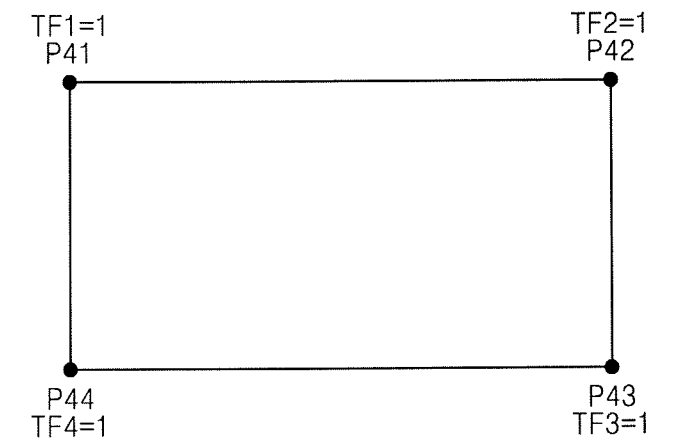

As illustrated in FIGS. 3 and 12A, the Hull shader 115-3A calculates tessellation factors TF1, TF2, TF3, and TF4 for each of points P41, P42, P43, and P44 using various algorithms, and assigns each of the tessellation factors TF1, TF2, TF3, and TF4 to each of the points P41, P42, P43, and P44.

As illustrated in FIGS. 7 and 12A, the Hull shader 115-3B may receive the tessellation factors TF1, TF2, TF3, and TF4 for each of the points P41, P42, P43, and P44 from outside, and may assign each of the tessellation factors TF1, TF2, TF3, and TF4 to each of the points P41, P42, P43, and P44.

For example, the Hull shader 115-3A or 115-3B may assign a first tessellation factor TF1 (=1) to a first point P41, may assign a second tessellation factor TF2 (=1) to a second point P42, may assign a third tessellation factor TF3 (=1) to a third point P43, and may assign a fourth tessellation factor TF4 (=1) to a fourth point P44.

Figure 12B:
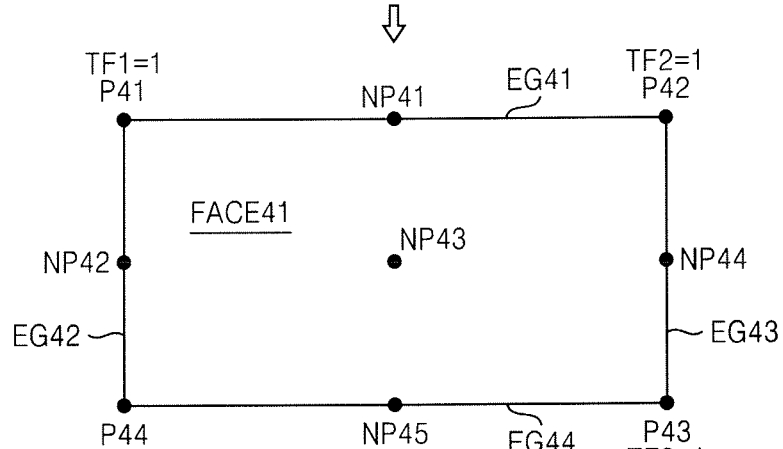

As illustrated in FIG. 12B, the tessellator 115-4A may receive tessellation factors TF1, TF2, TF3, and TF4, of which is assigned to each of the points P41, P42, P43, and P44, from the Hull shader 115-3A and 115-3B.

The tessellator 115-4A may generate a new points(s), which corresponds to the tessellation factor TF1 (=1) assigned to the first point P41, in the vicinity of the first point P41.

For convenience of description, it is assumed that the tessellator 115-4A generates a new point(s) in an order of the first point P41, P42, P43, and P44. However, the order may be changed according to embodiments of the present inventive concept.

For example, the tessellator 115-4A may generate a new point NP41 at the midpoint of the first edge EG41 using the first tessellation factor TF1 (=1) assigned to the first point P41, and may generate a new point NP42 at the midpoint of the second edge EG42, and may generate a new point NP43 at the center of the face FACE41 including the first point P41.

The tessellator 115-4A may generate a new point NP44 at the midpoint of the third edge EG43 using the second tessellation factor TF2 (=1) assigned to the second point P42. Since each of the new points NP41 and NP43 is already generated at each of the first edge EG41 and the face FACE41, the tessellator 115-4A might not generate an additional new point corresponding to the second tessellation factor TF2 (=1) at each of the first edge EG41 and the face FACE41.

The tessellator 115-4A may generate a new point NP45 at the midpoint of a fourth edge EG44 using the third tessellation factor TF3 (=1) assigned to the third point P43.

For example, since each of the new points NP43 and NP44 is already generated at each of the face FACE41 and the third edge EG43, the tessellator 115-4A might not generate an additional new point corresponding to the third edge EG43.

For example, since each of the new points NP42, NP43, and NP45 is already generated at each of the second edge EG42, the face FACE41, and the fourth edge EG44, the tessellator 115-4A might not generate an additional new point corresponding to the fourth tessellation factor TF4 (=1) at each of the second edge EG42, the face FACE41, the fourth edge EG44.

When the new points NP41, NP42, NP43, NP, 44, and NP45 are generated in the vicinity (e.g., EG41, EG42, EG43, EG44, and FACE41) of the points P41, P42, P43, and P44, the tessellator 115-4A generates connectivity information depicting a connectivity relationship among the points P41, P42, P43, and P44, and/or the new points NP41, NP42, NP43, NP44, and NP45.

Figure 12C:
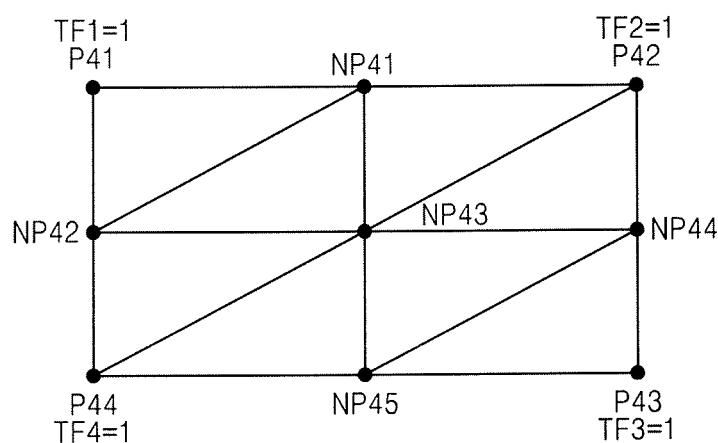

As illustrated in FIG. 12C, the tessellator 115-4A may generate primitives based on the generated connectivity information. For example, when no crack occurs, the tessellator-4A might not generate a primitive, as illustrated in FIG. 12C. As described in the above, a location of a generated new point (corresponding to a point) on an edge including the point or a face including the point may be changed according to embodiments of the present inventive concept.

In addition, when two tessellation factors are assigned to one edge, intervals between generated new points may be changed according to exemplary embodiments of the present inventive concept.

Figure 13A:
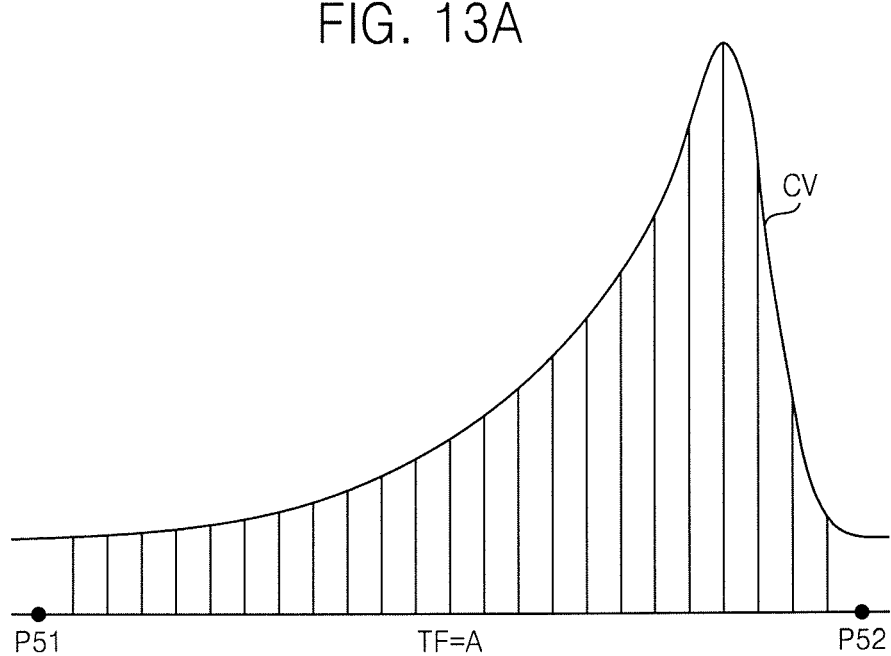
FIGS. 13A and 13B are diagrams for describing examples tracing a curve variation.
Figure 13B:
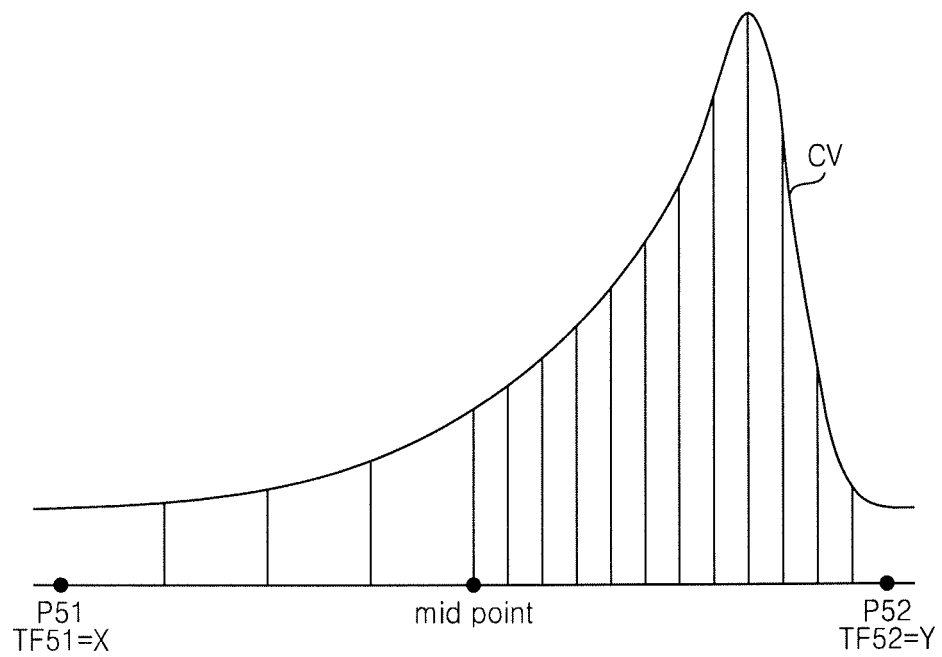

FIGS. 13A and 13B are diagrams for describing examples tracing a curve variation. FIG. 13A is a diagram when a method of assigning the tessellation factor per edge as a comparison example is used. FIG. 13B is a diagram when a method of assigning the tessellation factor per point according to an exemplary embodiment of the present inventive concept is used.

Referring to FIG. 13A, an edge is tessellated at equal intervals, regardless of variation in curvature CV, using a tessellation factor TF=A assigned to the edge between two points P51 and P52 in the comparison example.

Referring to FIG. 13B, an edge is tessellated adaptively to the variation in curvature CV using tessellation factors TF51=X and TF52=Y assigned to points P51 and P52, respectively, according to an exemplary embodiment of the present inventive concept. Here, the A, the X, and the Y are an integer or a decimal fraction.

Referring to FIG. 13B, for example, a portion having a smooth curvature is tessellated using a small tessellation factor TF51=X, and a portion having a rapid curvature is tessellated using a large tessellation factor TF51=Y, where Y>X.

According to an exemplary embodiment of the present inventive concept, a method of assigning a tessellation factor per point may more accurately trace a curve variation CV than a method of assigning a tessellation factor per edge or a method of assigning a tessellation factor per face does.

Thus, the method of assigning the tessellation factor per point according to an exemplary embodiment of the present inventive concept may reduce meaningless tessellation and graphics bandwidth requirements.

Figure 14:
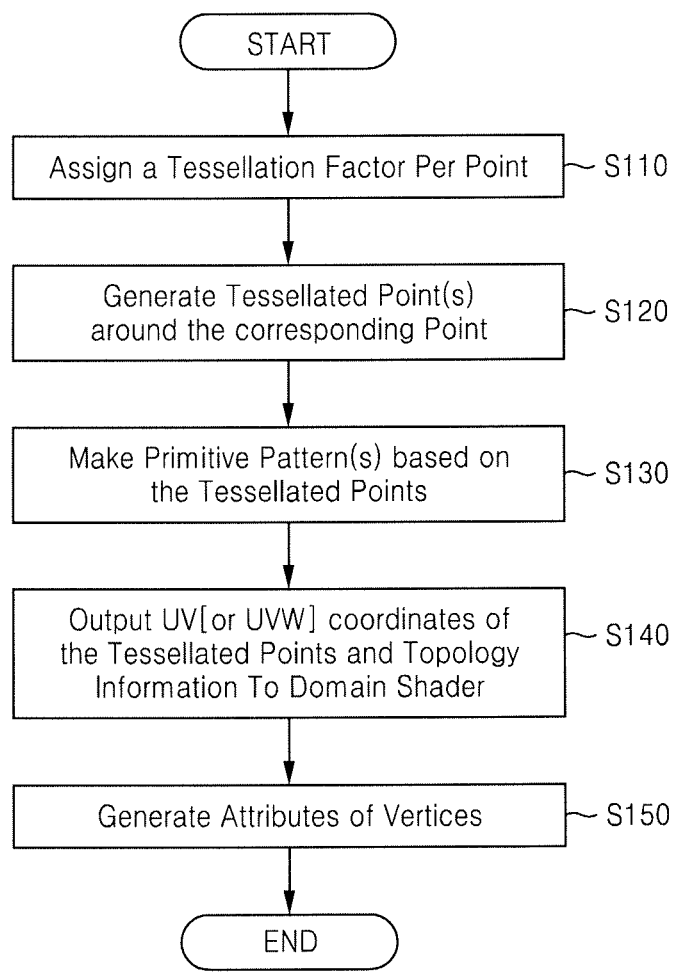
FIG. 14 is a flowchart for describing an operation of the Hull-shader and the tessellator according to an exemplary embodiment of the present inventive concept.

FIG. 14 is a flowchart for describing an operation of the Hull-shader and the tessellator according to an exemplary embodiment of the present inventive concept.

Referring to FIGS. 1 to 14, the Hull shader 115-3A or 115-3B assigns each of tessellation factors to each of input points included in an input patch or output points related to the input points (S110). When the Hull shader 115-3A is used, the tessellation factors may be calculated by the Hull shader 115-3A. When the Hull shader 115-3B is used, the tessellation factors may be input from outside of the Hull shader 115-3B.

The tessellator 115-4A may generate tessellated point(s) for each of output points OCP of the Hull shader 115-3A or 115-3B in the vicinity of the output point by using the output points OCP and tessellation factors each assigned to each of the output points. The number of the tessellated points for an output point may be the same as a value of the tessellation factor assigned to the output point (S120).

For example, the tessellator 115-4A may generate N (N is an integer or a decimal fraction) new points, which corresponds to the tessellation factor assigned to a current point, in the vicinity of the current point which is an object of a current tessellation operation among the output points OCP output from the Hull shader 115-3A or 115-3B.

The tessellator 115-4A may generate one or more primitive patterns based on the output points OCP and/or a tessellated point(s). Here, the tessellator 115-4A may perform a stitching operation to remove (or prevent) a crack.

For example, the tessellator 115-4A outputs a UV coordinate(s) (or a UVW coordinate(s)) of the tessellated point(s) TDP and topology information to the domain shader 115-5 (S130).

The topology information may include connectivity information of the output points OCP and/or connectivity information of the tessellated points TDP. The domain shader 115-5 may calculate attributes of vertices using outputs of the Hull shader 115-3A or 115-3B, and the tessellator 115-4A (S140).

According to an exemplary embodiment of the present inventive concept, a method of assigning a tessellation factor per point, may remove a crack occurring between faces sharing an edge or between faces sharing a point.

According to an exemplary embodiment of the present inventive concept, the method of assigning the tessellation factor per point may assign different tessellation factors based on curvature variation and thus, the curve variation may be more accurately traced.

Thus, the method of assigning the tessellation factor per point may reduce meaningless tessellations and graphic bandwidth requirement.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. A method of tessellating surfaces in a graphics pipeline by a graphics processor, the method comprising:
assigning a first tessellation factor to each of a first plurality of points in a patch;
generating, in the vicinity of a first point of the first plurality of points where the first point is on an edge of the patch, at least one second point, the second point corresponding to a second tessellation factor different than the first tessellation factor;
generating topology information including a connectivity relationship between the at least one second point and the first point; and
generating at least one primitive using the topology information when a crack occurs,
wherein the second point is on the same edge of the patch as the first point, and
wherein the primitive comprises a portion of the patch having at least one edge, the at least one edge including the second point corresponding to the second tessellation factor and the first point corresponding to the first tessellation factor.

2. The method of claim 1, wherein the tessellation factors are rational numbers greater than or equal to zero.

3. The method of claim 1, wherein the first and second points are on a vertex of the patch, the method further comprising:

generating at least one third point on the vertex, the third point corresponding to a third tessellation factor different than the first and second tessellation factors.

4. The method of claim 3, wherein each of the first through third points correspond to first through third edges, respectively, converging at the vertex.

5. The method of claim 3, wherein each of the first through third points correspond to first through third faces, respectively, converging at the vertex.

6. The method of claim 1, wherein the first point is on a vertex of the patch, the second point is generated at a portion of an edge to the vertex, and a third point corresponding to a third tessellation factor is generated at another edge to the vertex where the first point and the second point share the edge and the first point and the third point share the other edge.

7. The method of claim 1, wherein each of the plurality of points represents geometric data including at least one of a position and a normal vector.

8. The method of claim 1, wherein each of plurality of the points represents a vertex having attributes including a position, a normal vector, and a texture coordinate.

9. The method of claim 1, wherein the patch forma at least part of a parametric surface, subdivision surface, triangle mesh, or curve.

10. The method of claim 1, wherein the first tessellation factor is obtained by receiving from an external source or by calculation according to an algorithm.

11. The method of claim 1, wherein the second tessellation factor is different per point than the tessellation factors of all points on a same edge of the patch as the second point.

12. A graphics processing device, comprising:
a memory containing information defining a patch;
a graphics pipeline containing a hull shader and a tessellator; and
a topology generator in the graphics pipeline,
wherein the hull shader is coupled to the memory and configured to assign tessellation factors to each of plurality of points included in the patch by assigning a first tessellation factor to each of a first plurality of points in the patch,
wherein the tessellator is coupled to the hull shader and configured to generate, in the vicinity of a first point of the first plurality of points, at least one second point corresponding to a second tessellation factor by generating, in the vicinity of the first point where the first point is on an edge of the patch, the at least one second point on the same edge of the patch as the first point,
wherein the topology generator is configured to define topology information including a connectivity relationship between the at least one second point and the first point, and to generate at least one primitive using the topology information when a crack occurs, and
wherein the primitive comprises a portion of the patch having at least one edge, the at least one edge including the second point corresponding to the second tessellation factor and the first point corresponding to the first tessellation factor.

13. The device of claim 12, wherein the patch forms at least part of a parametric surface, subdivision surface, triangle mesh, or curve.

14. The device of claim 12, further comprising a memory storing the tessellation factor corresponding to each of the points to be used in the hull shader.

15. The device of claim 12, wherein the vicinity of the first point is the first point, an edge including the first point, or a face including the first point.

16. The device of claim 12, wherein the at least one second point is not generated when the second tessellation factor is a predetermined value.

17. The device of claim 16, wherein the predetermined value is zero.

18. The device of claim 12, wherein the tessellator generates topology information including connectivity relationship between the first point and the at least one second point.

19. The device of claim 18, wherein the tessellator generates at least one primitive using the topology information when a crack occurs.

20. The device of claim 12, wherein a number of the at least one first new point corresponds to the first tessellation factor.

21. The device of claim 12, wherein the second tessellation factor is different per point than the tessellation factors of all points on a same edge of the patch as the second point.

* * * * *